(12) United States Patent
Kamura et al.

(10) Patent No.: US 7,134,710 B2
(45) Date of Patent: Nov. 14, 2006

(54) AUTOMOTIVE FLOOR PANEL STRUCTURE

(75) Inventors: Takanobu Kamura, Hiroshima (JP); Masaru Chikita, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 143 days.

(21) Appl. No.: 10/910,645

(22) Filed: Aug. 4, 2004

(65) Prior Publication Data

US 2005/0040678 A1    Feb. 24, 2005

(30) Foreign Application Priority Data

Aug. 20, 2003    (JP)    ............... 2003-296473

(51) Int. Cl.
*B62D 25/20* (2006.01)
*F16F 7/00* (2006.01)
*F16F 15/00* (2006.01)

(52) U.S. Cl. ............... 296/193.07; 296/204; 296/1.03; 296/184.1

(58) Field of Classification Search ........... 296/193.07, 296/204, 184.1, 191, 203.01, 1.03, 39.3; 181/207; 267/90, 136
See application file for complete search history.

(56) References Cited

U.S. PATENT DOCUMENTS

| | | | | |
|---|---|---|---|---|
| 2,856,226 A | * | 10/1958 | Purdy | .................. 296/204 |
| 3,940,176 A | * | 2/1976 | Ito et al. | ............. 296/187.09 |
| 4,402,545 A | * | 9/1983 | Utsunomiya et al. | ....... 296/204 |
| 4,593,949 A | * | 6/1986 | Tanimoto | ................. 296/204 |
| 5,127,704 A | * | 7/1992 | Komatsu | ................. 296/204 |
| 5,549,349 A | * | 8/1996 | Corporon et al. | ...... 296/187.12 |
| 5,992,926 A | * | 11/1999 | Christofaro et al. | ........ 296/204 |
| 6,138,996 A | * | 10/2000 | Hayashi et al. | ............. 267/136 |
| 6,536,566 B1 | * | 3/2003 | Hasegawa et al. | .......... 188/378 |
| 6,793,276 B1 | * | 9/2004 | Sugihara et al. | ............ 296/204 |

FOREIGN PATENT DOCUMENTS

| | | |
|---|---|---|
| EP | 1 281 604 A2 | 2/2003 |
| JP | 09-202269 | 8/1997 |
| JP | 09 202269 | 4/2003 |

* cited by examiner

*Primary Examiner*—D. Glenn Dayoan
*Assistant Examiner*—Greg Blankenship
(74) *Attorney, Agent, or Firm*—Nixon Peabody LLP; Donald R. Studebaker (57) ABSTRACT

The present invention is a floor panel structure of a car body where an automobile floor comprises a floor panel that is connected to the frame members of the car body and also has a vibration mode adjusting structure that suppresses the generation of acoustic emission by generating 2×1 mode vibration in a predetermined frequency band. The floor panel has a non-rectangular vibration region and the vibration mode adjusting structure of the floor panels the vibration mode adjusting structure of the floor panel comprises a vibration adjusting part that defines the vibration distribution and vibration amplitude of the antinodes of 2×1 mode vibration, and the vibration adjusting part is disposed within the a non-rectangular vibration region so as to make the vibration volumes of two antinodes of vibration in 2×1 mode nearly the same.

9 Claims, 9 Drawing Sheets

PANEL A(FLOOR PANEL OF THE EMBODIMENT)
$f_r(2 \times 1)=251.6Hz$

FIG.5B

PANEL B
$f_r=316.8Hz$

AUTOMOTIVE FLOOR PANEL STRUCTURE

BACKGROUND OF THE INVENTION

1. Field of the Invention

The present invention relates to the floor panel structure of a car body and particularly to the floor panel structure of a car body where the floor of an automobile comprises floor panel provided connected to frame members of the car body.

2. Conventional Art

Vibration from frame members linked to the engine or suspension is known to be transmitted to floor panels, causing the floor panels to vibrate and as a result, the air within the passenger cabin vibrates greatly, thus generating unpleasant in-cabin vibrations and noise.

In this case, the source of vibration causing the problem may be vibration from the engine itself or road noise transmitted from the suspension, while this road noise typically includes components due to resonance of the tire cavity and components due to resonance of the suspension.

Typical measures conventionally taken to suppress this vibration and noise include applying vibration-damping materials and vibration-suppressing materials as various vibration-damping and vibration suppression measures. While it is possible to reduce vibration and noise in this manner, an extremely large amount of vibration-damping material and vibration-suppressing material is required, thus increasing the vehicle weight and leading to various deleterious effects and becoming a major problem on the cost side.

Moreover, the unpleasant vibration transmitted from the engine and suspension is mainly equal to or below 400 Hz in an automobile, and in particular, has a peak at a frequency near the 250 Hz which is road noise arising from tire cavity resonance. Thus, a technique is known by which a plurality of beads is formed in the floor panels, thus increasing the panel thickness and raising its rigidity, thereby shifting the natural frequency of the floor panel to a high band higher than 400 Hz. Specifically, an attempt is made to prevent the floor panel from resonating at the resonance frequency of the suspension and the tire cavity resonance frequency band, thus reducing unpleasant vibration and noise.

In this case, while this has the advantage of being able to suppress resonance peaks in low-frequency regions, vibration in the high-pitched regions conversely increases, so it becomes necessary to use large amounts of vibration-damping materials and vibration-suppressing materials in order to suppress vibration and noise in the high-frequency regions. In this manner, even in this case, the vehicle weight is increased as described above so there are various deleterious effects and problems on the cost side, so it is desirable to solve this problem.

Thus, the present inventors focused on the relationship between the vibration frequencies and vibration modes of vibrations transmitted to the floor panel and proposed a structure of a floor panel that has a vibration mode adjusting structure wherein the acoustic emission levels at specific vibration frequencies (resonance regions) become even smaller vibration modes as shown in Japanese Patent Unexamined Publication No. 9-202269 (JP-A-9-202269). This floor panel structure is one wherein the specific frequencies are frequencies near the 250 Hz of road noise arising from the tire cavity resonance transmitted to the floor panel as the most unpleasant vibration, and so the rigidity of the floor panel is partially adjusted so that the vibration mode of the floor panel becomes a vibration mode such as a 2×2 mode or 2×1 mode where an even number of vibration antinodes is generated, and thus with a setup where the sound waves radiated from the respective vibration antinodes cancel each other, it is possible to reduce the acoustic emission level and reduce noise within the cabin.

However, in the conventional case in which vibration-damping materials and vibration-suppressing materials are attached to the entire surface of the floor panel as described above, there are problems of increased materials costs and increased vehicle weight. In addition, if the panel thickness is increased, there is also a problem of increased vehicle weight.

In addition, with the floor panel structure recited in the Japanese Patent Unexamined Publication described above, in order to generate vibrations in a 2×1 mode, for example, the vibration region of the floor panel must have a roughly 2×1 rectangular shape, but because of the placement of components present below the floor of the automobile including the driveshaft, differential and other drive train components, suspension and other suspension system components, exhaust pipes, mufflers and other exhaust system components and the gasoline tank and the like, and also because of the relationship with the seat layout within the cabin, there are limitations to the layout of frame members, so there are cases wherein the floor panels attached to the floor members cannot be given a roughly 2×1 rectangular shape, and thus there is a problem in that it is not possible to generate vibrations in a 2×1 mode in this case.

On the other hand, when the vibration region of the floor panel is not a roughly 2×1 rectangular shape, it may be conceivable to make a 2×1 vibration region by using a highly rigid bead or the like to form a rectangular-shaped vibration region, but if the panel rigidity of the floor panel is high or the vibration region is relatively narrow, then the resonance frequency that the floor panel itself originally has is high, and if such a bead is provided on such a floor panel, then the rigidity of the floor panel is greatly increased and the resonance frequency is increased even further, resulting in the vibrations of the 2×1 mode being generated in a frequency band higher than 250 Hz, for example, and thus there is a problem in that it is not possible to generate 2×1 modes in frequencies near the 250 Hz which is the road noise arising from the cavity resonance of tires in particular.

In addition, even if 2×1 mode vibrations are generated in a vibration region that is not a 2×1 rectangular shape, because of differences in the distribution and amplitudes of the two antinodes of vibration in that 2×1 mode, a problem arises wherein the respective vibration volumes of the two antinodes become different and the effect of the sound waves radiated from the antinodes of the respective vibration canceling each other out becomes extremely small.

Here, the present inventors took note of the relationship between the rigidity of the floor panel and the vibration modes and thus attempted to solve the aforementioned problems with conventional art.

SUMMARY OF THE INVENTION

Therefore, it is an object of the present invention to solve the aforementioned problems of the aforementioned conventional art.

In the other words, it is an object of the present invention to provide the floor panel structure of a car body that is able to greatly reduce the sound radiated from floor panels due to vibration transmitted from the frame members of the body to panel areas and reduce the noise within the cabin without making the rigidity of the floor panel excessively high.

This and other objects of the present invention are achieved according to the present invention by providing a floor panel structure of a car body where an automobile floor comprises floor panel that is connected to frame members of the car body and that has a vibration mode adjusting structure which generates 2×1 mode vibration in a predetermined frequency band to suppress the generation of acoustic emission, wherein: the floor panel has a non-rectangular vibration region, the vibration mode adjusting structure of said floor panel has a vibration adjusting part that defines the vibration distribution and vibration amplitude of the antinodes of 2×1 mode vibration, the vibration adjusting part being disposed within said non-rectangular vibration region so as to make the vibration volumes of two antinodes of vibration in 2×1 mode nearly the same.

According to the present invention, the vibration mode adjusting structure which generates 2×1 mode vibration in a predetermined frequency band has a vibration adjusting part that defines the vibration distribution and vibration amplitude of the antinodes of 2×1 mode vibration, and thus even if the vibration region is not rectangular, 2×1 mode vibration can be reliably generated with the vibration volumes of two antinodes of vibration in the predetermined frequency band set to be roughly the same, so the acoustic emission from the floor panel due to vibration transmitted from the frame members of the car body to the floor panel is greatly decreased, and thus it is possible to reduce noise within the car cabin.

In a preferred embodiment of the present invention, the vibration adjusting part comprises a circular protrusion formed by causing the floor panel to protrude upward or downward.

According to the preferred embodiment above, the vibration adjusting part comprises a circular protrusion formed by causing the floor panel to protrude upward or downward, so it is possible to form the vibration adjusting part of the floor panel easily and effectively without making the rigidity of the floor panel excessively high, and moreover the vibration distribution and vibration amplitude of the antinodes of 2×1 mode vibration can be easily defined.

In another preferred embodiment of the present invention, it is preferable that the vibration adjusting part comprises a circular vibration damping material applied to the floor panel.

According to the preferred embodiment above, the vibration adjusting part comprises a circular vibration damping material applied to the floor panel, so it is possible to form the vibration adjusting part of the floor panel easily and effectively without making the rigidity of the floor panel excessively high, and moreover the vibration distribution and vibration amplitude of the antinodes of 2×1 mode vibration can be easily defined. In addition to the effect of reducing acoustic emission due to 2×1 mode vibration, it is also possible to obtain the effect of reducing acoustic emission due to the suppression of vibration of the floor panel by the vibration damping material.

In a still another preferred embodiment of the present invention, the non-rectangular shape of the vibration region of the floor panel includes two opposing short sides of different lengths and the vibration adjusting part is provided on the side nearest the longer of the two short sides.

According to the preferred embodiment above, the vibration adjusting part is provided on the side nearest the longer of the two short sides, so the region in which antinode of vibration occur is broad and by adjusting the vibration distribution and vibration amplitude on the side with the greater acoustic emission surface area, it is possible to easily make adjustment so that the vibration volumes of the two antinodes of vibration are set to be roughly the same.

In one more preferred embodiment of the present invention, the non-rectangular shape of the vibration region of the floor panel includes two opposing long sides and two of the vibration adjusting parts are provided aligned in a direction substantially parallel to the two long sides.

According to the preferred embodiment above, two of the vibration adjusting parts are provided aligned in a direction substantially parallel to the two long sides, so the two antinodes of vibration in 2×1 mode can be reliably generated such that they are aligned in the longitudinal direction of the non-rectangular vibration regions and also two vibration adjusting parts are provided, so it is possible to make adjustment so that the vibration volumes of the two antinodes of vibration are set to be roughly the same.

In one more preferred embodiment of the present invention, the vibration adjusting parts are provided upon a line passing nearly intermediate between the two long sides.

According to the preferred embodiment above, the vibration adjusting parts are provided upon a line passing nearly intermediate between the two long sides, so it is possible to easily make adjustment so that the vibration volumes of the two antinodes of vibration are set to be roughly the same.

In one more preferred embodiment of the present invention, the non-rectangular shape of the vibration region of said floor panel includes two opposing short sides of different lengths, and the two provided vibration adjusting parts are such that the one on the side of the longer of the two short sides has a greater dimension than the one on the other side.

According to the preferred embodiment above, the non-rectangular shape of the vibration region of said floor panel includes two opposing short sides of different lengths, and the two provided vibration adjusting parts are such that the one on the side of the longer of the two short sides has a greater dimension than the one on the other side, so it is possible to easily make adjustment so that the vibration amplitude of the antinodes of vibration on the side with a wider region in which antinode of vibration occur and having a larger acoustic emission surface area is smaller than the vibration amplitude of the antinode of vibration occurring in the other region, and as a result, it is possible to easily make adjustment so that the vibration volumes of the two antinodes of vibration in 2×1 mode are set to be the same.

In one more preferred embodiment of the present invention, the predetermined frequency band is a frequency band that nearly matches the tire cavity resonance frequency.

According to the preferred embodiment above, it is possible to greatly decrease the acoustic emission of the floor panel due to vibration transmitted to the floor panel from the car body frame members in a frequency band that nearly matches the tire cavity resonance frequency.

In one more preferred embodiment of the present invention, the predetermined frequency band is a frequency band at roughly 250 Hz.

According to the preferred embodiment above, it is possible to greatly decrease the acoustic emission of the floor panel due to vibration transmitted to the floor panel from the car body frame members in a frequency band at roughly 250 Hz.

The above and other objects and features of the present invention will be apparent from the following description by taking reference with accompanying drawings employed for preferred embodiments of the present invention.

DESCRIPTION OF THE PREFERRED EMBODIMENTS

The embodiment of the present invention will now be explained with reference to the appended drawings.

Figure 1:
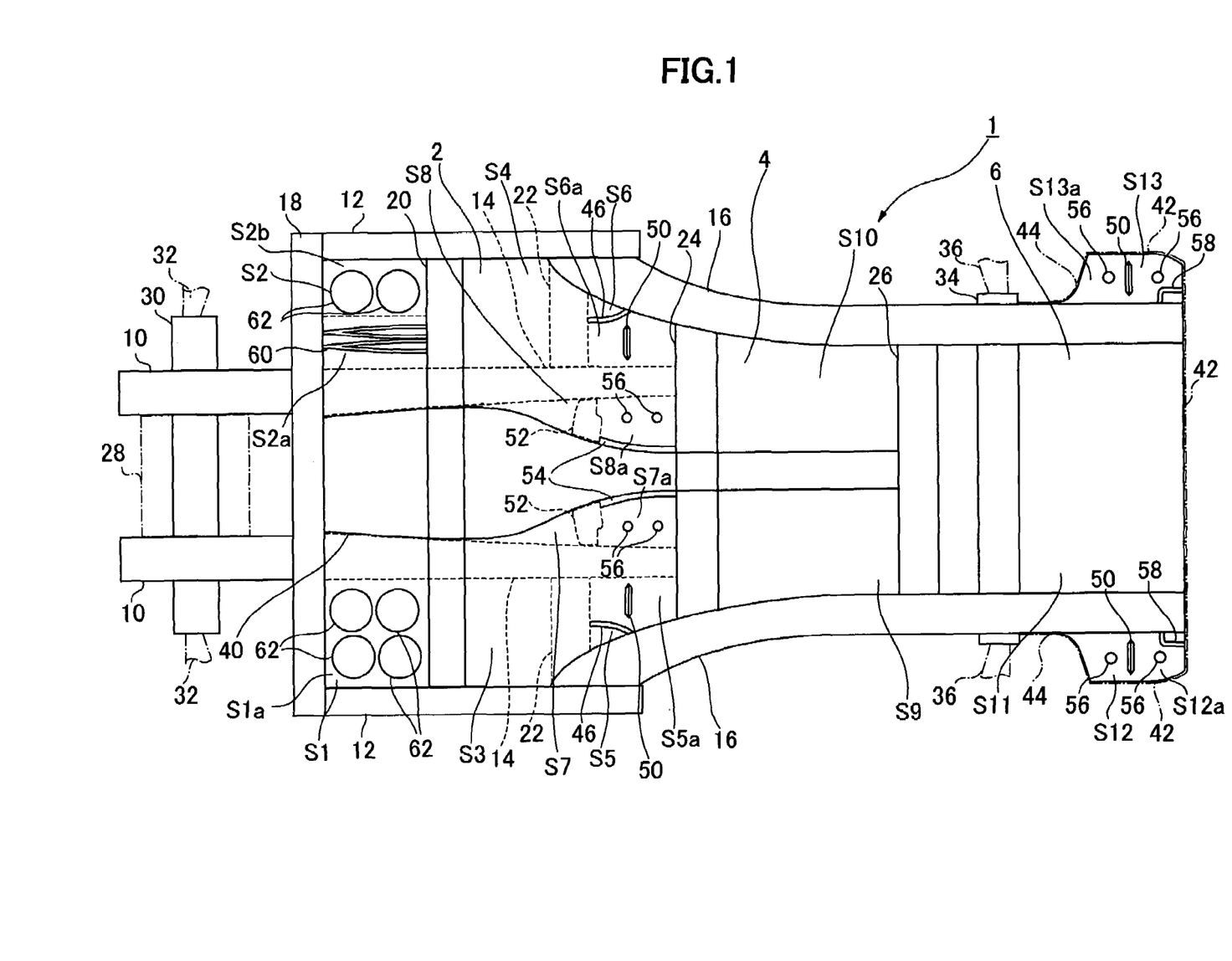
FIG. 1 is a plan view of an automobile underbody provided with the floor panel structure of a car body according to embodiments of the present invention.

FIG. 1 is a plan view of an automobile underbody provided with the floor panel structure of a car body according to embodiments of the present invention.

As shown in FIG. 1, an automobile underbody 1 comprises a plurality of frame members, a front floor panel 2 constituting the floor portion of the car cabin connected to the frame members, a center floor panel 4 located at a position higher than and behind this front floor panel 2 (in the car body direction), and also a rear floor panel 6 constituting the floor portion of the trunk located at a position higher than and behind this center floor panel 4 (in the car body direction).

The frame members are the front side frames 10, side sills 12, floor side frames 14, rear side frames 16, No. 1 cross member 18, No. 2 cross member 20, sub-cross member 22, No. 3 cross member 24 and No. 4 cross member 26.

Here follows a description of the frame members. As shown in FIG. 1, the side sills 12 with a closed cross-sectional structure that serve as reinforcing members in the car lengthwise direction extend in the car lengthwise direction on both sides of the automobile underbody 1 in the car crosswise direction, and the rear ends of the side sills 12 are joined to the No. 1 cross member 18 which is a reinforcing member in the car crosswise direction. Moreover, between the side sills 21 is provided a pair of floor side frames 14 each with a closed cross-sectional structure such that it extends in the car body lengthwise direction.

The front ends of the floor side frames 14 are joined to a pair of front side frames 10 provided such that they enclose the left and right sides of the engine compartment. An engine 28 and front suspension cross member 30 are attached to the front side frames 10, and a front suspension 32 is attached to this front suspension cross member 30.

In addition, rear side frames 16 with a closed cross-sectional structure extending in the car body lengthwise direction are joined to the rear ends of each of the side sills 12 on the inside in the car crosswise direction, and a rear suspension cross member 34 is attached to the rear side frames 16 and the rear suspension 36 is attached to this rear suspension cross member 34.

As reinforcing members in the car crosswise direction, in addition to the No. 1 cross member 18 described above, there are also provided a No. 2 cross member 20 extending in the car crosswise direction, sub-cross member 22, No. 3 cross member 24 and a No. 4 cross member 26.

The left and right ends of the No. 2 cross member 20 are joined to the respective side sills 21, the inside ends in the car crosswise direction of the sub-cross member 22 are joined to the floor side frames 14, and the outside ends in the car crosswise direction are joined to the rear side frames 16. In addition, the left and right ends of the No. 3 cross member 24 are joined to the respective rear side frames 16, and the rear ends of the aforementioned floor side frames 14 are joined to this No. 3 cross member 24. The left and right ends of the No. 4 cross member 26 are joined to the rear side frames 16.

In this manner, the floor panels 2, 4 and 6 are provided with a reinforcing structure in the car body lengthwise direction composed of the side sills 12 on the left and right edges, a pair of floor side frames 14 and a pair of rear side frames 16, along with a reinforcing structure in the car crosswise direction composed of the No. 1 cross member 18, No. 2 cross member 20, sub-cross member 22, No. 3 cross member 24 and No. 4 cross member 26. Thereby, the automobile body can be given adequate bending rigidity and torsion rigidity and also, deformation of the cabin particularly in an automobile head-on collision can be minimized so that the passengers can be protected reliably.

Here follows a description of the floor panels. As shown in FIG. 1, the front floor panel 2 is press-formed from steel sheet as a unit, having a floor tunnel 40 which bulges upward at a position roughly in the center of the car in the car crosswise direction and extends in the car body lengthwise direction. This floor tunnel 40 extends to the car-body rear edge of the center floor panel 4.

The front floor panel 2 is made up of eight floor panels S1–S8, each surrounded by the side sills 12 each extending in the car body lengthwise direction at both sides in the car crosswise direction, the floor side frames 14, rear side frames 16 and floor tunnel 40, along with the various cross members 18, 20, 22 and 24 each extending in the car crosswise direction.

Floor panel sections S1 and S2 constitute portions of the front floor panel 2 which is formed as a unit, being provided on the left and right sides of the floor tunnel 40, within spaces surrounded by the respective frame members composed of the side sills 12, the floor side frames 14, No. 1 cross member 18 and No. 2 cross member 20, with their peripheral edges joined to the frame members 12, 14, 18 and 20.

Floor panel sections S3 and S4 constitute portions of the front floor panel 2 which is formed as a unit, being provided on the left and right sides of the floor tunnel 40, within spaces surrounded by the respective frame members composed of the side sills 12, the floor side frames 14, No. 2 cross member 20 and sub-cross member 22, with their peripheral edges joined to the frame members 12, 14, 20 and 22.

Floor panel sections S5 and S6 constitute portions of the front floor panel 2 which is formed as a unit, being provided on the left and right sides of the floor tunnel 40, within spaces surrounded by the respective frame members composed of the rear side frames 16, the floor side frames 14, sub-cross member 22 and No. 3 cross member 24, with their peripheral edges joined to the frame members 14, 16, 22 and 24.

Floor panel sections S7 and S8 constitute portions of the front floor panel 2 which is formed as a unit, being provided on the left and right sides of the floor tunnel 40, within spaces surrounded by the floor tunnel 40 along with the frame members which are the floor side frames 14 and No. 3 cross member 24, with their outside edges joined on two sides to the frame members 14 and 24.

The center floor panel 4 is press-formed from steel sheet as a unit, having a floor tunnel 40 which bulges upward at a position roughly in the center of the car in the car crosswise direction and extends in the car body lengthwise direction. This center floor panel 4 is made up of floor panel sections S9 and S10, being provided on the left and right sides of the floor tunnel 40, within spaces surrounded by the floor tunnel 40 along with the frame members which are the rear side frames 16, No. 3 cross member 24 and No. 4 cross member 26, with their outside edges joined on three sides to the frame members 16, 24 and 26.

The rear floor panel 6 is press-formed from steel sheet as a unit, being made up of a floor panel section S11 surrounded by frame members which are the rear side frames 16 and the No. 4 cross member 26, and the rear body 42 which is a body structural member, along with, on both sides in the car crosswise direction, floor panel sections S12 and S13 which are surrounded by frame members which are the rear side frames 16, and the rear body 42 which is a body structural member. The floor panel section S11 has its peripheral edges joined to the frame members 16 and 26 and the rear body 42, while floor panel sections S12 and S13 have their peripheral edges joined to frame member 16, the rear body 42 and wheel housing 44.

With such an automobile underbody 1, the vibration and road noise from the engine 28, front suspension 32 and rear suspension 36 are transmitted through the front side frames 10, front suspension cross member 30 and rear suspension cross member 34, respectively, to the respective frame members 12, 14, 16, 18, 20, 22, 24 and 26 linked thereto, so the vibration and road noise are transmitted to the floor panel sections S1–S13.

As described above, the vibrations transmitted to the frame members from the engine and suspension are mainly in the frequency band near 250 Hz which is the cavity resonance frequency of the tires, and in the embodiment, by providing the floor panel sections S5, S6, S7, S12 and S13 with vibration mode adjusting structures, acoustic emission in the frequency band near 250 Hz from the floor panel sections S5, S6, S7, S12 and S13 due to vibration transmitted by the frame members 12, 14, 16, 18, 20, 22, 24 and 26 is suppressed. Note that the floor panel sections S1 and S2 have a conventional vibration mode adjusting structure to be described later, while floor panel sections S3, S4, S9, S19 and S11 are composed of conventional flat panels.

Figure 2A:
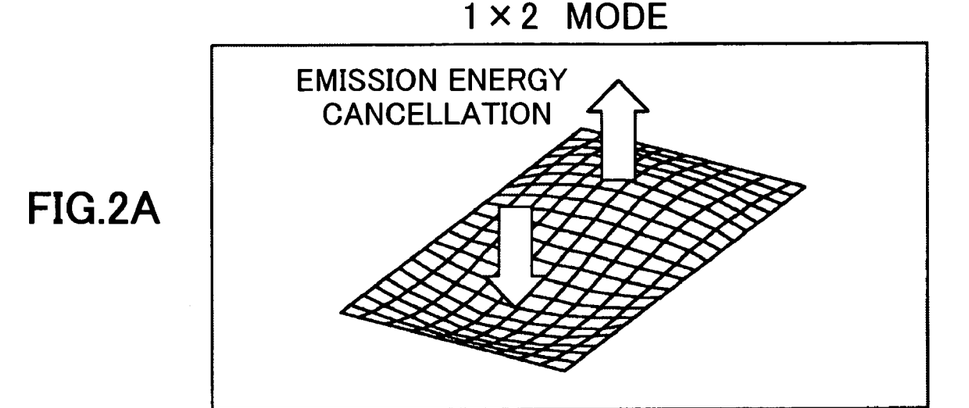
FIGS. 2A and 2B are schematic drawings illustrating the cancellation of sound emitted by the floor panel with a vibration mode adjusting structure.
Figure 2B:
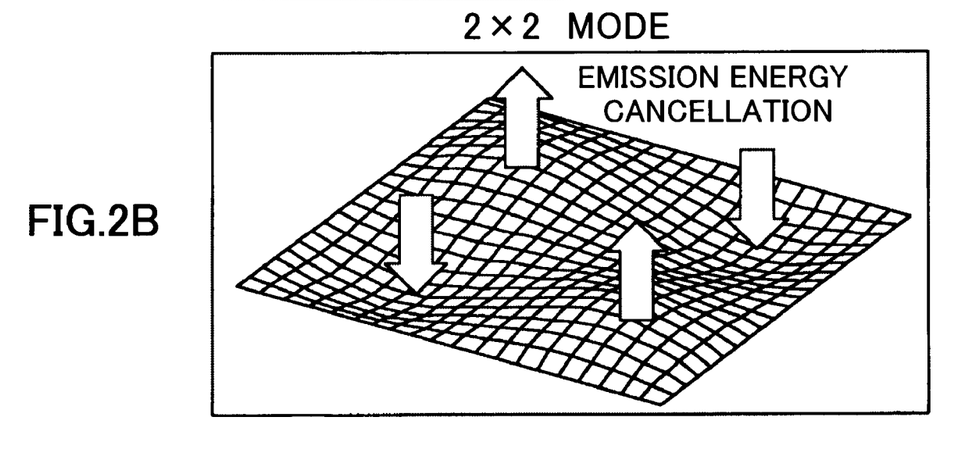
Figure 3:
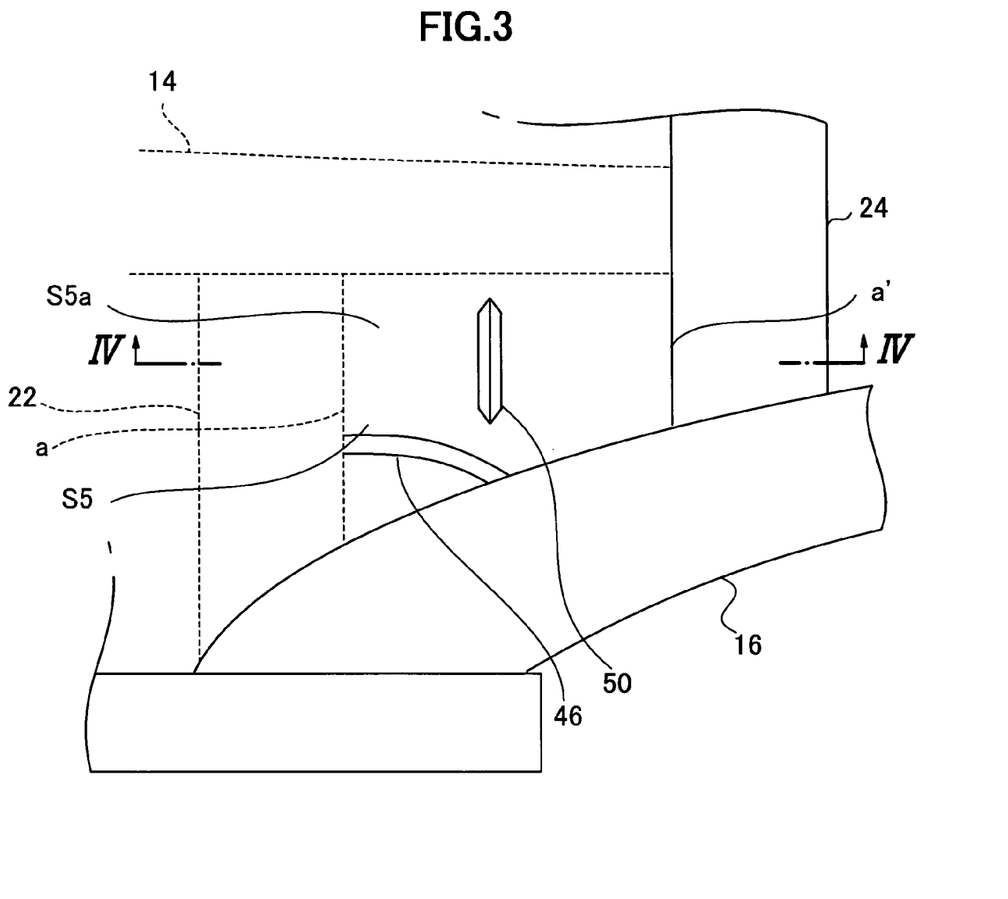
FIG. 3 is an enlarged plan view of floor panel area S5 according to a first embodiment of the present invention.
Figure 4:
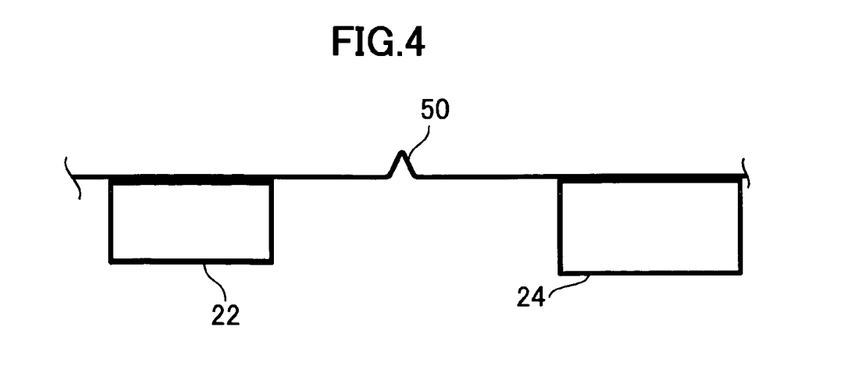
FIG. 4 is a cross section along IV—IV of FIG. 3.

Here follows a detailed description of the car body floor panel structure according to a first embodiment of the present invention. FIG. 2 is a schematic drawing illustrating the cancellation of sound emitted by the floor panel with a vibration mode adjusting structure; FIG. 3 is an enlarged plan view of floor panel area S5 which is the first embodiment of the present invention; and FIG. 4 is a cross section along IV—IV of FIG. 3.

Here follows a description of the vibration mode adjusting structure. The vibration mode adjusting structure in the car body floor panel structure according to the embodiment is one wherein the floor panel is made to vibrate at a predetermined frequency in predetermined vibration modes having low acoustic emission efficiencies.

The basic theory of this vibration mode adjusting structure is described in detail in the aforementioned in the aforementioned Japanese Patent Unexamined Publication (JP-A-9-202269). In short, taking n and m to be the number of antinodes of a standing wave generated in the lengthwise and crosswise directions, respectively, of a rectangular region, as illustrated in the examples shown in FIG. 2, if "n×m=even number" is true, then acoustic emissions from adjacent portions in opposite phases within the panel in question cancel each other, so the acoustic emission energy is greatly decreased. In addition, in the conventional vibration mode adjusting structure, if vibration region generating this n×nm standing wave is a 2×1 mode, then a rectangle of a size of 2×1 is required, but if a 2×2 mode, then it must be roughly square.

Acoustic emission from the floor panels is caused by road noise and engine or suspension vibration transmitted from the frame members 12, 14, 16, 18, 20, 22, 24 and 26 as described above. In the embodiment, acoustic emissions due to the tire cavity resonance frequencies that appear in frequency bands mainly near 250 Hz are reduced by the vibration mode adjusting structure.

As shown in FIG. 1 and FIG. 3, floor panel section S5 has the edges on its four sides surrounded by a floor side frame 14, rear side frame 16, sub-cross member 22 and No. 3 cross member 24. In addition, a reinforcing bead 46 for maintaining the strength of the floor panel is provided on floor panel section S5. In this floor panel section S5, vibration region S5a which is a region surrounded by the floor side frame 14, rear side frame 16, sub-cross member 22, No. 3 cross member 24 and reinforcing bead 46, is not rectangular in shape and its surface area is relatively small, so even if a vibration region of a size 2×1 is formed by means of beads or the like as described above, the rigidity of the floor panel would increase greatly so that its resonance frequency would exceed 250 Hz, and thus it would not be possible to generate 2×1 vibration modes in the frequency band near 250 Hz and thus it is not possible to reduce acoustic emission.

Thus, in the embodiment, as shown in FIG. 3, a bead 50 that extends linearly in the car crosswise direction is formed within the non-rectangular vibration region S5a of floor panel section S5 as a vibration adjusting part of the vibration mode adjusting structure. As shown in FIG. 3 and FIG. 4, this bead 50 is shaped with both ends becoming gradually narrower toward the tips in a triangular shape, with the floor panel section S5 itself protruding downward.

With the embodiment, in the vibration region S6a, the size and arrangement of the bead 50 is arranged so that vibrations in the 2×1 mode are induced in the frequency band near 250 Hz that nearly matches the tire cavity resonance frequency and also the vibration volumes of the two antinodes of vibration in the 2×1 mode become the same.

Specifically, the rigidity of the bead 50 is increased and thus vibrates less readily, so the bead becomes a node of vibration in the 2×1 mode, and thus adjusting the position of this bead 50 defines the position of a node of the vibration in the 2×1 mode and also makes the vibration volumes of the antinodes of vibration in the 2×1 mode arising in the two regions on either side of the bead 50 the same.

In addition, the bead 50 is disposed such that it does not touch any of the frame members 14, 16, 22, 24 or the reinforcing bead 46, so that it does not divide the vibration region S5a. In addition, the bead 50 is disposed such that it extends in a direction substantially parallel to the short sides a and a', so that the antinodes of the 2×1 mode vibration in the car body lengthwise direction of the vibration region.

In addition, the size of the bead 50 is adjusted so that the 2×1 mode vibration occurs in vibration region S5a at the frequency band near 250 Hz that nearly matches the tire cavity resonance frequency.

In this manner, the bead 50 which is the vibration adjusting part is disposed within a non-rectangular vibration region as described above so as to form two regions wherein the vibration volumes of the two antinodes of vibration of the 2×1 mode are roughly the same, and by adjusting its size, the 2×1 mode vibrations are generated in the frequency band near 250 Hz which is a frequency band that nearly matches the tire cavity resonance frequency.

In floor panel section S6 also, in the same manner as floor panel section S5, a bead 50 is provided in vibration region S6a which is a region surrounded by a floor side frame 14, rear side frame 16, sub-cross member 22, No. 3 cross member 24 and a reinforcing bead 46.

Here, the bead 50 may be formed such that it protrudes upward. In addition, while both ends of the bead 50 are preferably triangular in shape, they may also assume another shape wherein they become gradually narrower toward the tip, such as a semicircle, ellipse or other curved shape.

In addition, in lieu of the bead 50, vibration-damping material that is formed in the same shape as the bead 50 may also be applied to the upper surface or lower surface of the floor panel. When vibration-damping material is used in lieu of the bead 50 in this manner, in addition to the effect of reducing acoustic emissions due to 2×1 mode vibration, the effect of reducing acoustic emissions due to the damping of vibrations in the floor panel itself is also obtained.

We shall next describe the function and advantageous effects of the vibration mode adjusting structure according to the first embodiment provided on floor panel sections S5 and S6.

With floor panel sections S5 and S6, even if the vibration region is non-rectangular, by providing the bead 50 which is the vibration adjusting part in the respective vibration regions S5a and S6a, 2×1 mode vibrations are generated in the frequency band near 250 Hz which is a frequency band that nearly matches the tire cavity resonance frequency and the vibration volumes of the two antinodes of vibration of the 2×1 mode are made to be roughly the same, thereby reducing acoustic emissions from this vibration region.

In addition, by adjusting the position of the bead 50 with its rigidity increased so that it becomes a node of vibration, the position of a node of the vibration in the 2×1 mode is defined and also this makes the vibration volumes of the antinodes of vibration in the 2×1 mode arising in the two regions on either side of the bead 50 the same.

In addition, in comparison to the case of providing rectangular beads in order to create vibration regions of the size 2×1, the bead 50 does not greatly increase the rigidity of the vibration region of the floor panel, so by adjusting the size of the bead 50, it is possible to adjust the rigidity of the vibration region S5a itself, so that vibration in the 2×1 mode is generated in the frequency band near 250 Hz.

In addition, by extending the bead 50 in a direction substantially parallel to the short sides a and a', namely by disposing the vibration region S5a so that it is divided into two in the car body lengthwise direction, two antinodes of vibration are aligned in the longitudinal direction of vibration region S5a which is overall longer in the car body lengthwise direction, so 2×1 mode vibration is reliably generated and also the position of the bead 50 can be easily adjusted so that the vibration volumes of the two antinodes of vibration are made the same.

In addition, by disposing the bead 50 such that it does not touch the frame members 14, 16, 22 and 24 and the reinforcing bead 46, the vibration regions S6a and S7a are not divided, so it is possible to avoid impeding the generation of 2×1 mode vibrations in the vibration regions.

In addition, both ends of the bead 50 are triangular in shape and become narrower toward their tips, and thus node of vibration can be effectively generated also in the floor panel portions between the tips and the frame members 14, 16, 22 and 24 and the reinforcing bead 46.

Figure 5A:
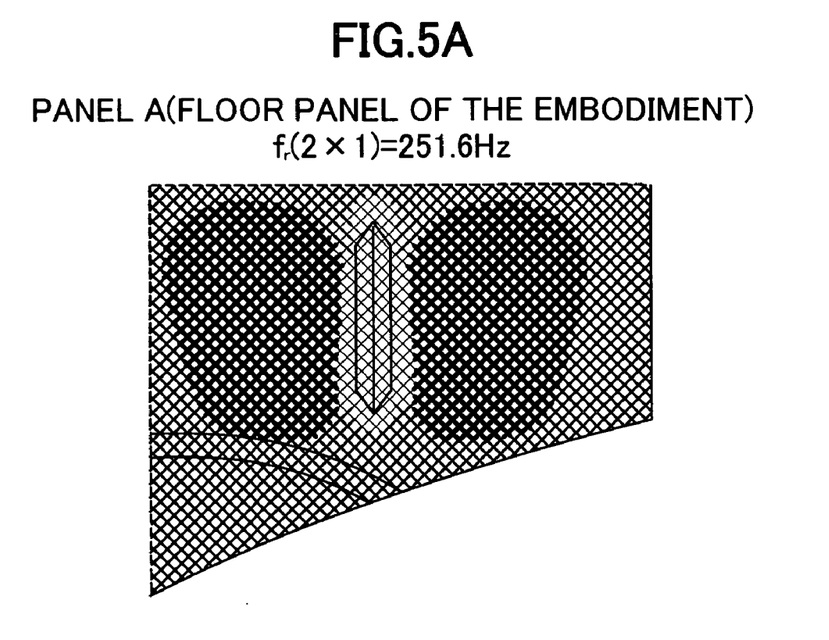
FIGS. 5A and 5B are diagrams illustrating experimental results using an experimental model used to explain the vibration mode characteristics of the vibration mode adjusting structure according to the embodiment of the present invention.
Figure 5B:
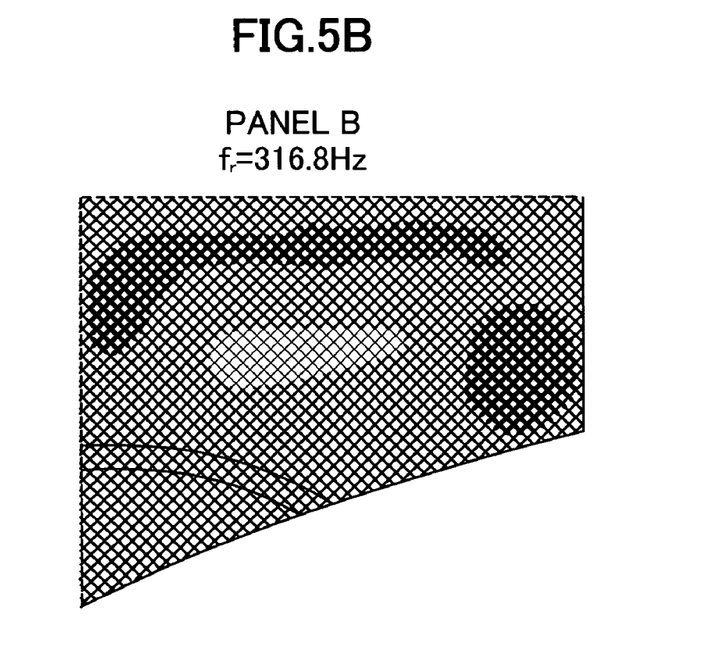

We shall next use FIG. 5 to describe the vibration mode characteristics of the vibration mode adjusting structure of a car body floor panel according to the embodiment of the present invention.

In order to confirm the vibration mode characteristics of the embodiment, we prepared a floor panel section S5 (hereinafter referred to as "Panel A") with a bead 50 of the vibration mode adjusting structure according to the first embodiment of the present invention and a floor panel section S5 (hereinafter referred to as "Panel B") with no such bead provided, and placed the Panels A and B in the region of the automotive underbody floor panel section S5 shown in FIG. 1. A portion of each of the panels was subjected to vibration at frequencies sweeping from 10 Hz to 400 Hz, and the vibration modes of Panel A and Panel B were measured.

FIG. 5 is a diagram illustrating the vibration modes of Panels A and B, where FIG. 5A shows the vibration modes of Panel A and FIG. 5B shows the vibration modes of Panel B.

As is evident from FIG. 5A, with Panel A where the bead 50 is provided (the embodiment), one can see that vibrations in a 2×1 mode are generated. On the other hand, with Panel B (prior art), no vibrations clearly in the 2×1 mode are generated over the range from 10 Hz to 400 Hz. Panel B has a resonance point near 315 Hz, for example, so a vibration mode as shown in FIG. 5B is generated. As a result, the advantageous effect of the vibration mode adjusting structure of the embodiment was confirmed.

Figure 6:
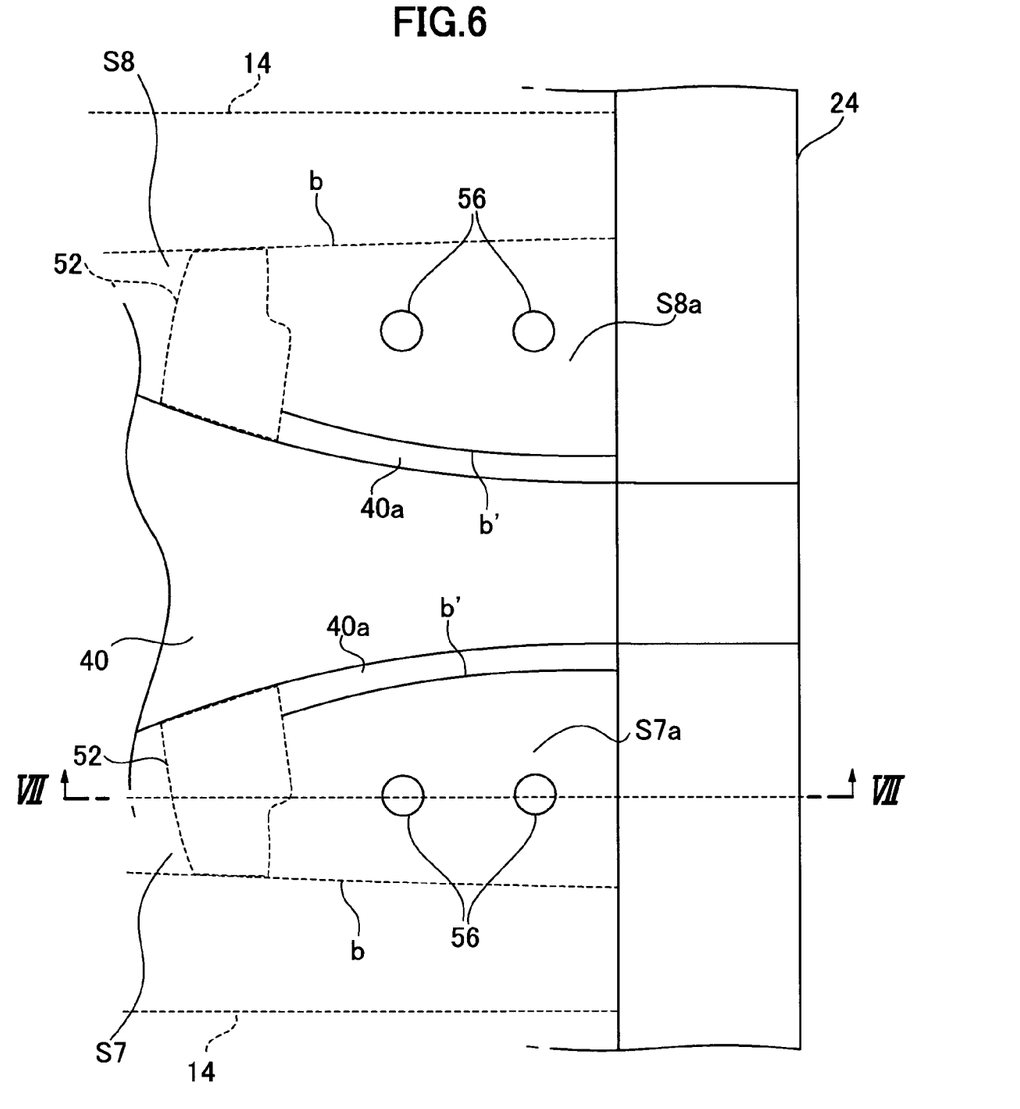
FIG. 6 is an enlarged plan view of vibration regions S7a and S8a of floor panel areas S7 and S8 according to a second embodiment of the present invention.
Figure 7:
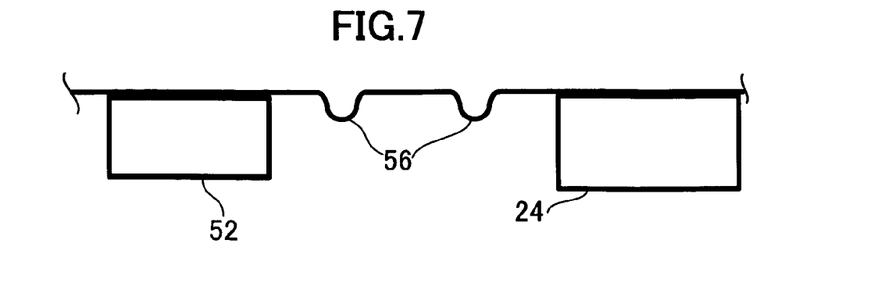
FIG. 7 is a cross section along VII—VII of FIG. 6.

Next, FIGS. 1, 6 and 7 will be used to describe the car body panel structure according to a second embodiment of the present invention. FIG. 6 is an enlarged plan view of vibration regions S7a and S8a of floor panel areas S7 and S8 which are the second embodiment of the present invention; FIG. 7 is a cross section along VII—VII of FIG. 6. The car body floor panel structure according to the second embodiment is applied to floor panel sections S7 and S8, where a protrusion is provided as the vibration adjusting part of the vibration mode adjusting structure.

As shown in FIG. 1, floor panel section S7 is surrounded in its periphery by floor side frame 14, No. 3 cross member 24 and floor tunnel 40. In addition, a bracket 52 for supporting a driveshaft (not shown) which passes through the floor tunnel 40 is attached to the floor panel section S7 on the underside of the car body, and the outside end of bracket 52 in the car crosswise direction is attached to the floor side frame 14, while its inside end in the car crosswise direction is positioned on the fringe of the floor tunnel 40. Within this floor panel section S7, vibration region S7a which is the region surrounded by the floor side frame 14, No. 3 cross member 24, the floor tunnel fringe 40a and bracket 52 is not rectangular in shape and its surface area is relatively small, so it is not possible to reduce acoustic emission in the frequency band near 250 Hz by creating a vibration region of the size of 2×1 by means of a bead or the like as described above.

Thus, in the embodiment, as shown in FIG. 6, two roughly circular protrusions 56 aligned in the car body lengthwise direction are formed as the vibration adjusting parts of the vibration mode adjusting structure. As shown in FIG. 7, the protrusions 56 are formed by making a portion of the floor panel section S7 protrude downward.

In the embodiment, in vibration region S7a, the size and arrangement of the protrusions are adjusted so that vibrations in the 2×1 mode are induced in the frequency band near 250 Hz that nearly matches the tire cavity resonance frequency and also, the vibration volumes of the two antinodes of vibrations in the 2×1 mode are made to be the same.

Specifically, by adjusting the position and size of the respective protrusions 56, the vibration distribution and vibration amplitudes of the respective two antinodes of the vibration in 2×1 mode are adjusted so that the vibration volumes of the two antinodes is made to be the same, and in order to make the antinodes of 2×1 mode vibration be aligned in this vibration region S7a in the car body lengthwise direction, two protrusions are provided such that they are aligned in the car body lengthwise direction. The protrusions are provided mainly to define the vibration distribution and vibration amplitude of the antinodes of 2×1 mode vibration, so they may be made relatively small in comparison to the vibration region.

In addition, two of the protrusions 56 are provided aligned in a direction substantially parallel to the long sides b and b', so that antinodes of the 2×1 mode vibration are aligned in the vibration region in the car body lengthwise direction.

In addition, by adjusting the size of the protrusions 56, the vibration region S7a is caused to undergo 2×1 mode vibration in the frequency band near 250 Hz.

In this manner, the protrusions 56 which are the vibration adjusting parts define the vibration distribution and vibration amplitude of the antinodes of the respective 2×1 mode vibrations, and are disposed within the non-rectangular vibration regions so that the vibration volumes of the two antinodes of vibration in 2×1 mode are roughly the same. In addition, by adjusting their size, 2×1 mode vibration is caused to occur in the frequency band near 250 Hz that nearly matches the tire cavity resonance frequency.

Note that the protrusions 56 may also be formed so that they protrude upward. In addition, in lieu of the protrusions 56, vibration-damping material that is formed in the same shape as the protrusions 56, namely nearly circular in the case of the embodiment, may also be applied to the upper surface or lower surface of the floor panel. When vibration-damping material is used in lieu of the protrusions 56 in this manner, in addition to the effect of reducing acoustic emissions due to 2×1 mode vibration, the effect of reducing acoustic emissions due to the damping of vibrations in the floor panel itself is also obtained.

In floor panel section S8 also, in the same manner as in floor panel section S7, protrusions 56 are provided in the vibration region S8a which is the region surrounded by floor side frame 14, No. 3 cross member 24, floor tunnel fringe 40a and bracket 52.

We shall next describe the function and advantageous effects of the vibration mode adjusting structure according to the second embodiment provided on floor panel sections S7 and S8.

With floor panel sections S7 and S8, even if the vibration region is non-rectangular, by providing the protrusions 56 which are the vibration adjusting parts in the respective vibration regions S7a and S8a, 2×1 mode vibrations are generated in the frequency band near 250 Hz which is a frequency band that nearly matches the tire cavity resonance frequency and the vibration volumes of the two antinodes of vibration of the 2×1 mode are made to be roughly the same, thereby reducing acoustic emissions from this vibration region.

In addition, the protrusions 56 are formed such that they have increased rigidity and are of a size that is relatively small in comparison to that of the vibration region, so it is possible to make the antinodes of vibration occur more readily in the periphery of the protrusions 56. In addition, the vibration distribution of the antinodes of 2×1 mode vibration can be mainly adjusted by adjusting the positions of the protrusions 56, and the vibration amplitude of the antinodes of 2×1 mode vibration can be mainly adjusted by adjusting the sizes of the protrusions 56.

In addition, by providing two protrusions 56 such that they are aligned in a direction substantially parallel to the long sides b and b', two antinodes of vibration are aligned in the longitudinal direction of vibration region S7a which is overall longer in the car body lengthwise direction, so 2×1 mode vibration is reliably generated and also with two protrusions 56, the position and size of the protrusions 56 can be easily adjusted so that the vibration volume of the two antinodes of vibration are made the same.

In addition, the protrusions 56 are provided in order to adjust the vibration distribution and the vibration amplitude, so in comparison to the beads 50 whose rigidity has to be increased to a certain extent in order to generate a node of vibration, their rigidity can be made smaller. Specifically, the vibration regions S7a and S8a of floor panel sections S7 and S8 are smaller than the vibration regions S5a and S6a of floor panel sections S5 and S6, so, for example, if the beads 50 which are the vibration mode adjusting structures of the first embodiment of the present invention are provided in vibration regions S7a and S8a, then the rigidity of vibration regions S7a and S8a would be increased, and even in the case in which the 2×1 resonance frequency should exceed 250 Hz, with the protrusions 56, the rigidity of the vibration regions need not be increased excessively much, and 2×1 mode vibrations in the frequency band near 250 Hz can be generated.

Figure 8:
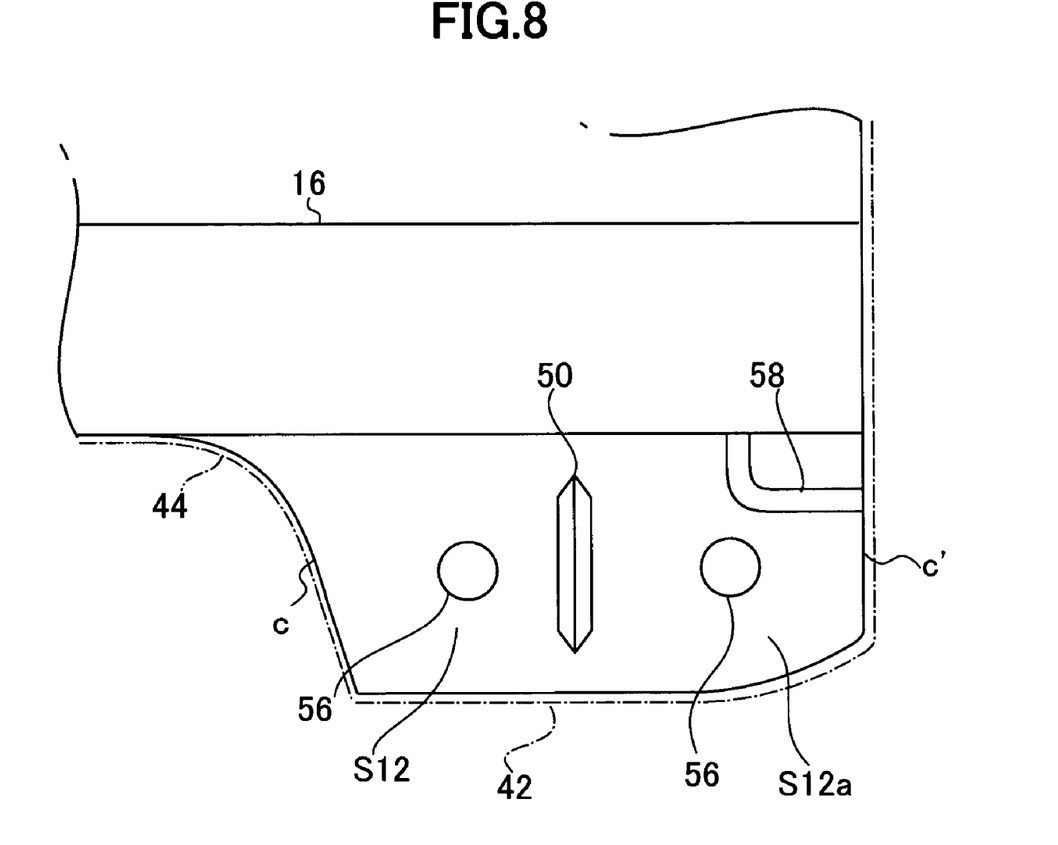
FIG. 8 is an enlarged plan view of floor panel area S12 according to a third embodiment of the present invention.

Next, FIGS. 1 and 8 will be used to describe in detail the car body panel structure according to a third embodiment of the present invention. FIG. 8 is an enlarged plan view of floor panel section S12 which is the third embodiment of the present invention. The car body floor panel structure according to the third embodiment is applied to floor panel sections S12 and S13, where there is provided a vibration mode adjusting structure which is a combination of the beads according to the first embodiment of the present invention and the protrusions according to the second embodiment of the present invention is provided as the vibration adjusting part of the vibration mode adjusting structure.

As shown in FIG. 1 and FIG. 8, floor panel section S12 is surrounded in its periphery by rear side frame 16, rear body 42 and wheel housing 44. In addition, a reinforcing bead 58 for maintaining the strength of the floor panel is provided on the floor panel section S12. Within this floor panel section S12, vibration region S12a which is the region surrounded by the rear side frame 16, rear body 42, wheel housing 44 and reinforcing bead 58 is not rectangular in shape and its surface area is relatively small, so as described above it is not possible to reduce acoustic emission in the frequency band near 250 Hz by creating a vibration region of the size of 2×1 by means of a bead or the like as described above.

Thus, in the embodiment, as shown in FIG. 8, a bead 50 extending in the car crosswise direction and two roughly circular protrusions 56 aligned in the car body lengthwise direction on either side of this bead are formed as the vibration adjusting parts of the vibration mode adjusting structure. The shapes of the bead 50 and the protrusions 56 are the same as those of the beads 50 and protrusions 56 provided in the aforementioned vibration regions S5a, S6a, S7a and S8a in floor panel sections S5 through S8.

In the embodiment, in vibration region S12a, the size and arrangement of the bead 50 and protrusions 56 are adjusted so that vibrations in the 2×1 mode are induced in the frequency band near 250 Hz that nearly matches the tire cavity resonance frequency and also, the vibration volumes of the two antinodes of vibrations in the 2×1 mode are made to be the same.

Specifically, by defining the position of the node of 2×1 mode vibration by adjusting the position of the bead 50 and by adjusting the position and size of the respective protrusions 56, the vibration distribution and vibration amplitudes of the antinodes of the vibration in 2×1 mode are defined and the vibration volume of the two antinodes of vibration is made to be the same. Moreover, by adjusting the sizes of the bead 50 and the protrusions 56, the vibration region S12a is caused to undergo 2×1 mode vibration in the frequency band near 250 Hz.

In addition, by disposing the bead 50 such that it extends in a direction substantially parallel to the short sides c and c', and also by providing the protrusions 56 in each of the two regions formed by bead 50, the antinodes of 2×1 mode vibration are generated such that they aligned in the car body lengthwise direction of the vibration region. Moreover, by disposing the bead 50 such that it does not touch the rear side frame 16, rear body 42, wheel housing 44 and reinforcing bead 58, the vibration regions S126a is not divided.

In floor panel section S13 also, in the same manner as floor panel section S12, a bead 50 and protrusions 56 are provided in the vibration region S13a which is the region surrounded by the rear side frame 16, rear body 42, wheel housing 44 and reinforcing bead 58.

We shall next describe the function and advantageous effects of the vibration mode adjusting structure according to the third embodiment provided on floor panel sections S12 and S13.

With floor panel sections S12 and S13, even if the vibration region is non-rectangular, by providing the beads 50 and protrusions 56 which are the vibration adjusting structures in the vibration regions S12a and S13a, 2×1 mode vibrations are generated in the frequency band near 250 Hz which is a frequency band that nearly matches the tire cavity resonance frequency and the vibration volumes of the two antinodes of vibration of the 2×1 mode are made to be roughly the same, thereby reducing acoustic emissions from this vibration region.

In addition, the beads 50 and protrusions 56 which are the vibration mode adjusting structures do not greatly increase the rigidity of the floor panel vibration regions in comparison to the case of providing beads or the like in a longitudinal shape in order to create vibration regions of a size 2×1, so by adjusting the sizes of the beads 50 and protrusions 56, it is possible to adjust the rigidity of the vibration regions S12a and S13a themselves, so 2×1 mode vibrations are generated in the frequency band near 250 Hz.

In addition, by adjusting the position of the bead 50, the position of the node of the 2×1 vibration mode is defined and also, by adjusting the position of the bead 50 and the position and size of the respective protrusions 56 of the two regions formed by means of the bead, it is possible to define the vibration distribution and vibration amplitude of the two antinodes of vibration in 2×1 mode.

In addition, by disposing the bead 50 such that it extends in a direction substantially parallel to the short sides c and c' and also providing protrusions 56 in each of the respective regions formed by the bead 50, two antinodes of vibration are aligned in the longitudinal directions of vibration regions S12a and S13a which are overall longer in the car body lengthwise direction, so 2×1 mode vibration is reliably generated and also the position and size of the bead 50 and protrusions 56 can be easily adjusted so that the vibration volumes of the two antinodes of vibration are made the same.

In addition, the bead 50 is disposed such that it does not touch the frame member 16, body structural members 42 and 44 and the reinforcing bead 58, so it is possible to avoid impeding the generation of 2×1 mode vibration in the vibration region.

In addition, both ends of the bead 50 are formed to be triangular in shape, and thus node of vibration can be effectively generated also in the floor panel portions between their tips and the frame member 16, body structural members 42 and 44 and the reinforcing bead 58.

Figure 9A:
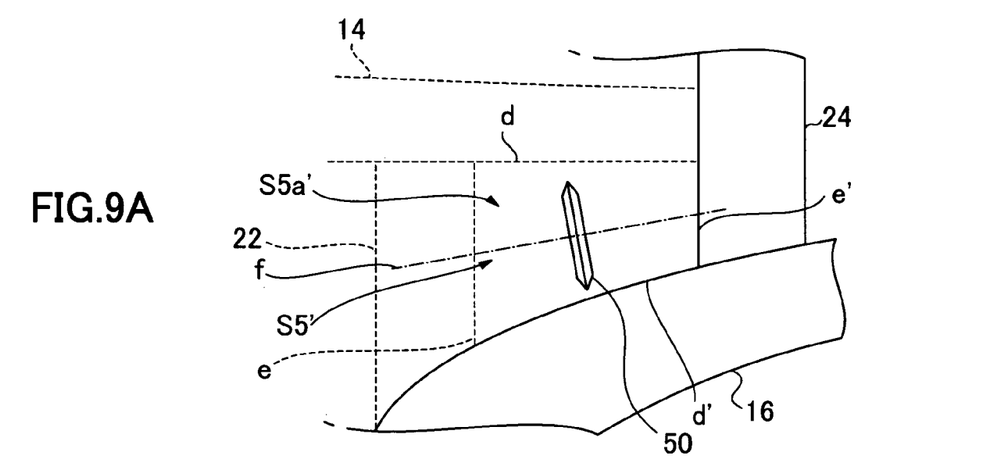
FIGS. 9A, 9B, and 9C are plan views of variations of the floor panel structures of a car body according to the first, second and third embodiments of the present invention.
Figure 9B:
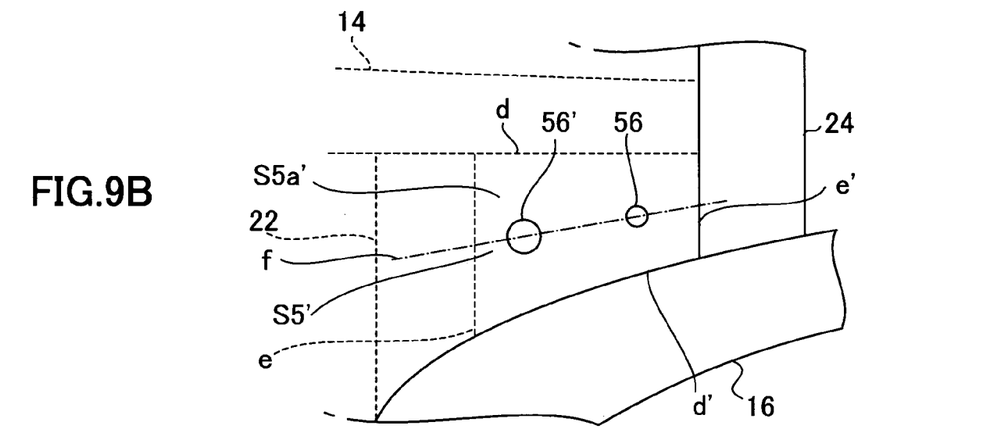
Figure 9C:
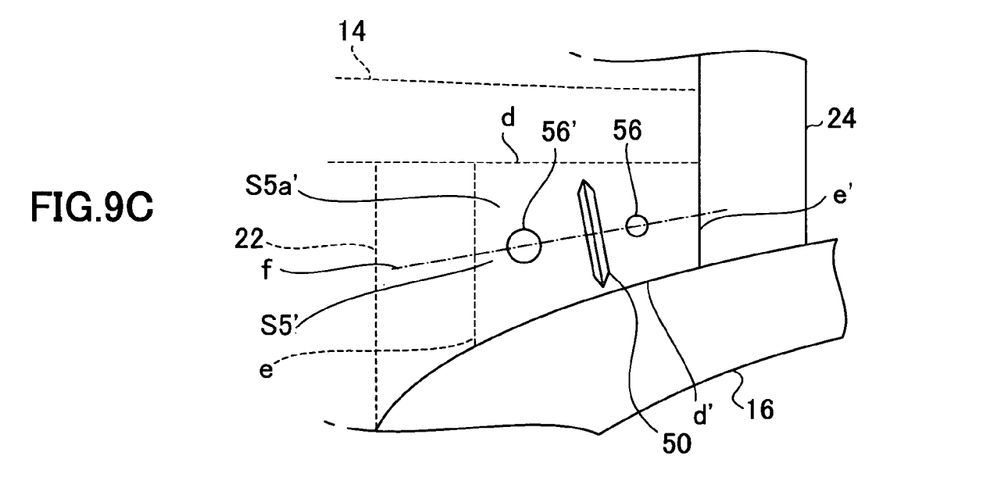

Next, FIG. 9 will be used to describe variations of the vibration mode adjusting structures of the first, second and third embodiments. FIG. 9A is a plan view of a variation of the car body floor panel structure of the first embodiment of the present invention; FIG. 9B is similarly a plan view of a variation of the car body floor panel structure of the second embodiment of the present invention; FIG. 9C is similarly a plan view of a variation of the car body floor panel structure of the third embodiment of the present invention; where each is an example being applied to the region of floor panel section S5.

In the variations, the reinforcing bead 46 which had been provided in floor panel section S5 is not provided. In the floor panel sections S5' according to the variations, the vibration adjusting parts of the vibration mode adjusting structure are provided within the non-rectangular vibration region S5a' which is the region which is the region surrounded by the floor side frame 14, rear side frame 16, sub-cross member 22 and No. 3 cross member 24.

The floor panel section S5' shown in FIG. 9A includes the two opposing long sides d and d' and the two opposing short sides e and e', where the bead 50 is disposed so as to extend in a direction substantially parallel to the short sides e and e' and is also provided so as to extend in a direction roughly perpendicular to a line f passing through the rough center of the two long sides d and d'.

The floor panel section S5' shown in FIG. 9A includes the two opposing long sides d and d' and the two opposing short sides e and e', where the bead 50 is disposed so as to extend in a direction substantially parallel to the short sides e and e' and is also provided so as to extend in a direction roughly perpendicular to a line f passing through the rough center of the two long sides d and d'.

The floor panel section S5' shown in FIG. 9B has two protrusions 56 and 56' provided upon line f passing through the rough center of the two long sides d and d'. In addition, protrusion 56' which is on the side closer to the short side e which is the longer of the two opposing short sides e and e' is larger in dimension than protrusion 56 which is on the side closer to the other, shorter short side e'. Note that in the variation shown in FIG. 9B, a protrusion may also be provided only on the side closer to the longer of the short sides, e.

The floor panel section S5' shown in FIG. 9C has a bead 50 disposed so as to extend in a direction substantially parallel to the short sides e and e' and also so as to extend in a direction roughly perpendicular to a line f passing through the rough center of the two long sides d and d', and also, one of the two regions formed by this bead 50, in this variation the region on the side toward the front in the car body lengthwise direction, namely the region on the side of short side e is larger in surface area. In addition, the two protrusions 56 and 56' are provided upon the line f such that they are aligned in a direction roughly perpendicular to the bead 50. Moreover, the protrusions 56 are formed such that, protrusion 56' in the region with the larger surface area of the two regions formed by bead 50, namely the region on the side of short side e, has a dimension larger than that of the other protrusion 56.

In the variations also, the bead 50 and/or protrusions 56 which are the vibration mode adjusting structures provided in vibration region S5a' cause 2×1 mode vibration to occur in the frequency band near 250 Hz that nearly matches the tire cavity resonance frequency and also cause the vibration volume of the two antinodes of vibration to be the same.

Specifically, with the vibration mode adjusting structure shown in FIG. 9A, bead 50 is disposed so as to extend in a direction substantially parallel to the two short sides e and e' and also so as to extend in a direction roughly perpendicular to a line f passing through the rough center of the two long sides d and d', so it is possible to reliably cause two antinodes of vibration in 2×1 mode to occur in vibration region S5a' and also the vibration volumes of the two antinodes of vibration can be easily adjusted to be the same.

In addition, in the vibration mode adjusting structure shown in FIG. 9B, the two protrusions 56 are provided upon the line f that passes roughly intermediate between the two long sides d and d', so 2×1 mode vibration can be reliably generated in vibration region S5a'. Moreover, with the vibration mode adjusting structure shown in FIG. 9B, the protrusions 56 are formed such that, protrusion 56' in the region with the larger surface area of the two regions formed by bead 50, namely the region on the side of short side e, has a configuration larger than that of the other protrusion 56. Here, the antinode formed on the side of the longer of the short sides e readily reaches a larger vibration surface area than the other antinode, so its surface area for emitting acoustical energy readily becomes that much larger. Accordingly, by making the dimension of the protrusion 56' on the side of the longer of the short sides e larger, the vibration amplitude of the antinode in the region on the side of that short side e is made smaller than the vibration amplitude of the antinode in the region on the other side, and thus it is easy to adjust the vibration volumes of the two antinodes of vibration in 2×1 mode to be the same.

In addition, with the vibration mode adjusting structure shown in FIG. 9C, bead 50 is disposed in the same manner as in the vibration mode adjusting structure shown in FIG. 9A, so two antinodes of vibration in 2×1 mode can be reliably caused to occur in vibration region S5a' and also, the vibration volumes of the two antinodes of vibration can be easily adjusted to be he same. Moreover, with the vibration mode adjusting structure shown in FIG. 9C, bead 50 is formed so that the two regions formed by this bead 50 are such that the surface area of one of the regions is larger than the surface area of the other region and also, of the protrusions 56 and 56' formed in either of the two regions, the protrusion 56' provided in the region formed with a larger surface area has a dimension larger than that of the protrusion 56 provided in the other region, so the vibration amplitude of the antinode of vibration generated in the region that is formed with a larger surface area and has a larger acoustic emission surface area is made to be smaller than the vibration amplitude of the antinode of vibration generated in the other region, so the vibration volumes of the two antinodes of vibration in 2×1 mode can be easily adjusted to be the same.

Figure 10:
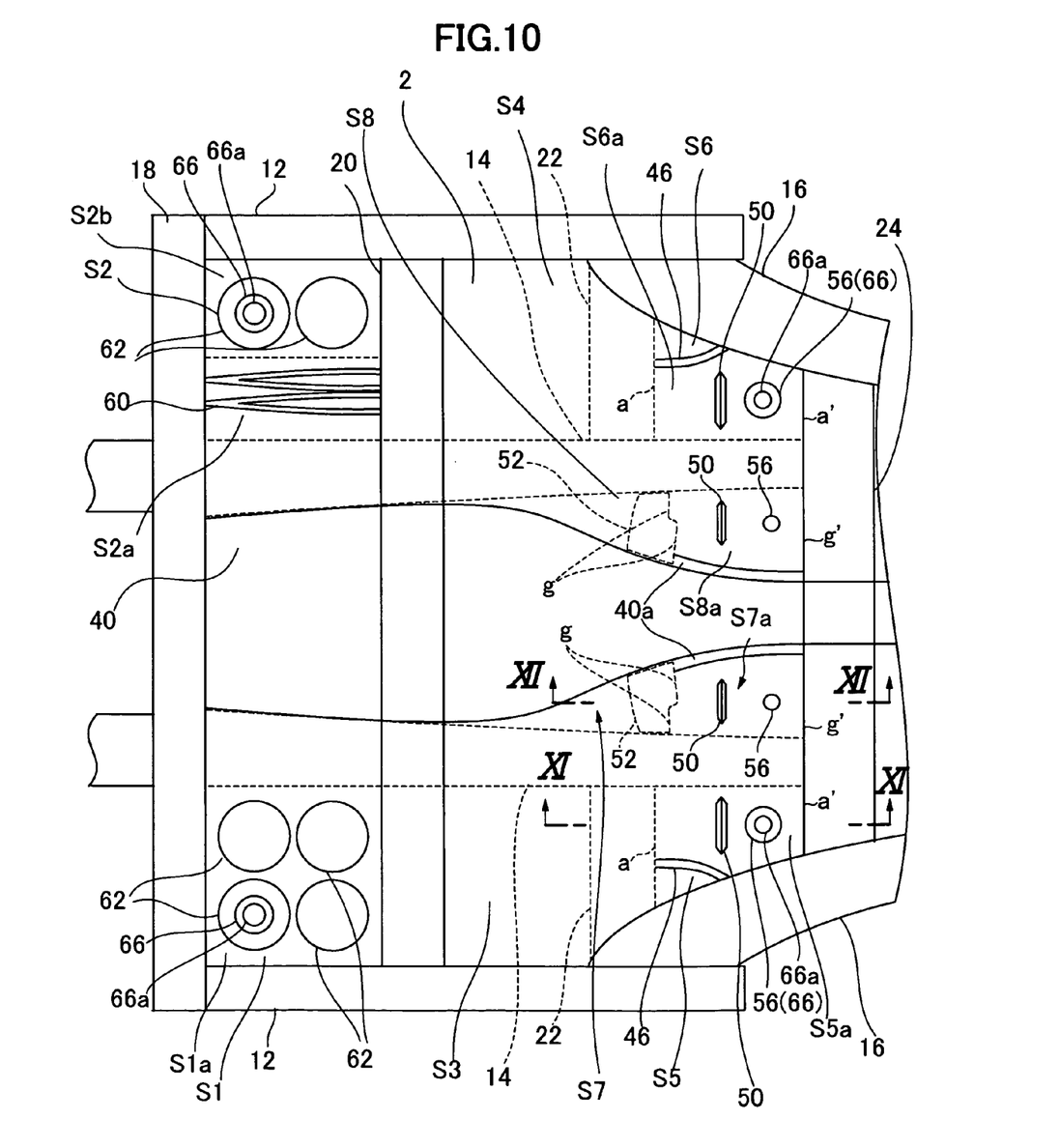
FIG. 10 is a plan view of a front floor panel provided with the floor panel structures of a car body according to a forth embodiment of the present invention.
Figure 11:
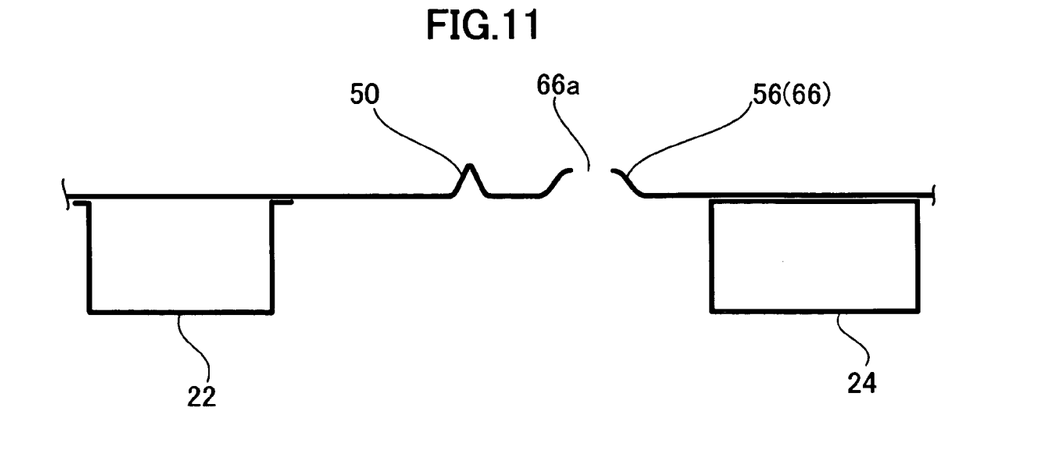
FIG. 11 is a cross section along XI—XI of FIG. 10.
Figure 12:
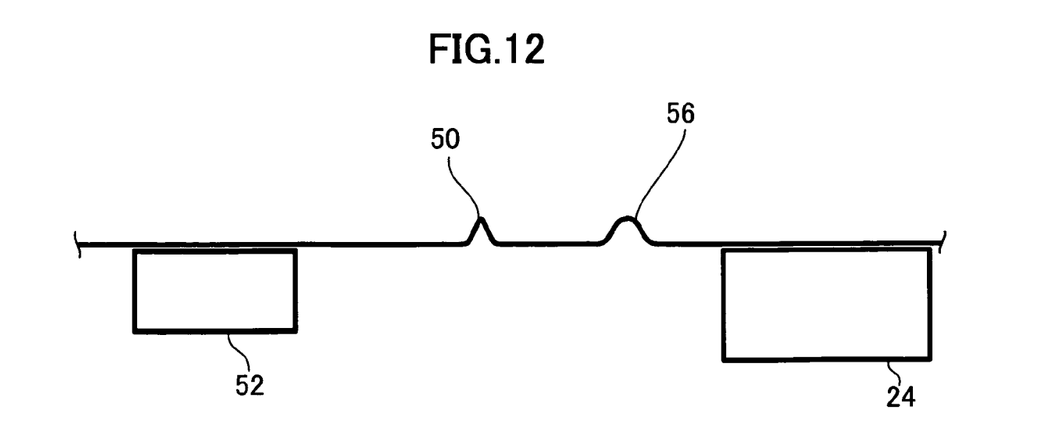
FIG. 12 is a cross section along XII—XII of FIG. 10.

Next, FIGS. 10–12 will be used to describe in detail the car body panel structure according to the fourth embodiment of the present invention. FIG. 10 is a plan view of a front floor panel 2 provided with the floor panel structures of a car body according to the fourth embodiment of the present invention. FIG. 11 is a cross section along XI—XI of FIG. 10. FIG. 12 is a cross section along XII—XII of FIG. 10. The car body floor panel structure according to the fourth embodiment of the present invention is applied to floor panel sections S5 through S8, wherein a combination of a bead and one protrusion is provided as the vibration adjusting part of the vibration mode adjusting structure.

With the front floor panel 2 shown in FIG. 10, the car body vibration mode adjusting structure according to the fourth embodiment of the present invention is provided on floor panel sections S5 through S8, while the conventional vibration mode adjusting structure to be described later is provided on floor panel sections S1 and S2, and floor panel sections S3 and S4 are composed of conventional flat panels. The basic structure of floor panel sections S5 through S8 is the same as that of the second and third embodiments of the present invention so only the portions that differ will be described with reference to FIGS. 10–12.

As the vibration adjusting parts of the vibration mode adjusting structure, a bead 50 extending in the car crosswise direction and a protrusion 56 are formed within each of the non-rectangular vibration regions S5a, S6a, S7a and S8a of the floor panel sections S5, S6, S7 and S8, respectively. In the embodiment, the bead 50 extends in a direction substantially parallel to the two opposing short sides a and a' or the short sides g and g', and also the bead 50 is disposed such that one of the two regions formed by the bead 50, in the embodiment the region toward the rearward side in the car body lengthwise direction, has a larger surface area than the other region. One protrusion 56 is provided in the region formed with a larger surface area among the two regions formed by the bead 50.

The shape of the beads 50 provided in the vibration regions S5a, S6a, S7a and S8a is the same as that of the bead 50 according to the first embodiment of the present invention, being formed such that a portion of the floor panel itself protrudes, as shown in FIG. 11 and FIG. 12.

As shown in FIG. 10, the protrusions 56 provided in vibration regions S5a and S6a are nearly circular and, as shown in FIG. 10 and FIG. 11, a hole 66a to be described later is provided at the bottom. As described above, the protrusions 56 adjust the vibration distribution and vibration amplitude of the 2×1 mode vibrations, but together with the press-forming indentations to be described later, the hole 66a is formed of such a size that it does not have deleterious effects on the 2×1 mode vibrations of vibration regions S5a and S6a.

The protrusions provided in vibration regions S7a and S8a are nearly circular as shown in FIG. 10, and are formed such that a portion of the floor panel protrudes upward as shown in FIG. 12.

Next, as shown in FIG. 10, in addition to the structures of floor panel sections S1 and S2 (FIG. 1) to be described later, floor panel sections S1 and S2 are provided with an indentation for press forming 66 in one of the rigidity adjustment areas 62 to be described later of floor panel sections S1 and S2, respectively, and a hole 66a is provided at the bottom of each indentation for press forming 66.

Here follows a description of the indentation for press forming 66 and hole 66a. The indentations for press forming 66 are disposed on the floor panel sections S1, S2, S5 and S6 which roughly serve as the four corners of the front floor panel 2, and serve the role of increasing the accuracy of forming when the front floor panel 2 is formed. Specifically, the indentations for press forming 66 and holes 66a fit into a press forming jig when the front floor panel 2 is press formed, thus serving the role of fixing the position and height of the front floor panel 2 to fixed positions.

With the embodiment, in vibration regions S5a, S6a, S7a and S8a, the size and layout of the bead 50 and protrusions 56, respectively, are adjusted so that 2×1 mode vibration is induced in the frequency band near 250 Hz that nearly matches the tire cavity resonance frequency and also, the vibration volumes of the two antinodes of vibration in 2×1 mode are the same.

Specifically, the position of the node of 2×1 mode vibration is defined by adjusting the positions of the bead 50 and moreover, by adjusting the position and height of the protrusions 56, the vibration distribution and vibration amplitude of the antinodes of 2×1 mode vibration are defined, thus making the vibration volumes of the two antinodes of vibration in 2×1 mode the same. In addition, by adjusting the size of the bead 50 and protrusions 56, the vibration regions S5a, S6a, S7a and S8a are made to each induce 2×1 mode vibration in the frequency band near 250 Hz.

In addition, by disposing the bead 50 such that it extends in a direction substantially parallel to the two opposing short sides a and a' or the short sides g and g', the antinodes of 2×1 mode vibration are generated such that they are aligned in the car body lengthwise direction of the vibration region. Moreover, the bead 50 is disposed such that it does not touch the frame members 14, 16, 22 and 24, floor tunnel fringe 40a, reinforcing bead 46 and the bracket 52, so the vibration regions S5a, S6a, S7a and S8a are not divided.

We shall next describe the function and advantageous effects of the vibration mode adjusting structure according to the fourth embodiment provided on floor panel sections S5 through S8.

With floor panel sections S5 through S8, even if the vibration region is non-rectangular, by providing the beads 50 and protrusions 56 which are the vibration adjusting structures in the vibration regions S5a, S6a, S7a and S8a, 2×1 mode vibrations are generated in the frequency band near 250 Hz which is a frequency band that nearly matches the tire cavity resonance frequency and the vibration volumes of the two antinodes of vibration of the 2×1 mode are made to be roughly the same, so acoustic emissions from this vibration region can be reduced.

In addition, the beads 50 and protrusions 56 which are the vibration mode adjusting structures do not greatly increase the rigidity of the floor panel vibration regions in comparison to the case of providing beads or the like in a longitudinal shape in order to create vibration regions of a size 2×1, so 2×1 mode vibrations can be generated in the frequency band near 250 Hz.

In addition, by disposing the bead 50 such that it extends in a direction substantially parallel to the short sides a and a' or the short sides g and g', namely such that it divides the vibration regions S5a, S6a, S7a and S8a into two in the car body lengthwise direction, two antinodes of vibration are aligned in the longitudinal directions of vibration regions S5a, S6a, S7a and S8a which are overall longer in the car body lengthwise direction, so 2×1 mode vibration is reliably generated and also the position and size of the bead 50 and protrusions 56 can be easily adjusted so that the vibration volumes of the two antinodes of vibration are made the same.

In addition, this bead 50 is formed so that the two regions formed by this bead 50 are such that the surface area of one of the regions is larger than the surface area of the other region and also, the bead is formed such that the surface area of one of the regions is greater than the surface area of the other region, and the protrusion 56 is provided in the region formed to have a large surface area, so by setting the vibration amplitude of the antinodes of vibration arising in the region that is formed to have a large surface area and that has a large acoustic emission surface area to be smaller than the vibration amplitude of the antinodes of vibration arising in the other region, so the vibration volumes of the two antinodes of vibration in 2×1 mode can be easily adjusted to be the same.

In addition, the bead 50 is disposed such that it does not touch the frame members 14, 16, 22 and 24, the floor tunnel fringe 40a, reinforcing bead 46 and bracket 52, so it is possible to avoid impeding the generation of 2×1 mode vibrations in the vibration regions. Moreover, both ends of the bead 50 are formed to be triangular in shape, and thus node of vibration can be effectively generated also in the floor panel portions between their tips and the frame members 14, 16, 22 and 24, the floor tunnel fringe 40a, reinforcing bead 46 and bracket 52, Next, FIG. 1 will be used to describe the car body panel structure of floor panel sections S1 and S2. The vibration mode adjusting structure provided in floor panel sections S1 and S2 is the same as the floor panel structure recited in the aforementioned Japanese Patent Unexamined Publication (JP-A-9-202269). Note that the vibration mode adjusting structure provided in floor panel sections S1 and S2 shown in FIG. 10 has the same basic constitution as that shown in FIG. 1.

As shown in FIG. 1, the floor panel sections S1 and S2 have their four sides surrounded by the side sills 12, floor side frame 14, No. 1 cross member 18 and the No. 2 cross member 20. The vibration region S1a surrounded by floor panel section S1 is roughly square in shape and made so that it generates 2×2 mode vibration modes. In addition, floor panel section S2 is provided with a reinforcing bead 60 for maintaining the strength of the floor panel, and the region S2a where this reinforcing bead 60 is provided, namely the region in FIG. 1 surrounded by a broken line and the frame members 14, 18 and 20, is made so that specific vibration modes are not easily generated, but the remaining region S2b, namely the region in FIG. 1 surrounded by a broken line and the frame members 12, 18 and 20 has a rectangular shape of a size roughly 2×1, so vibration mode of the 2×1 mode are caused to occur.

Moreover, roughly circular rigidity adjusting parts 62 for adjusting the rigidity of the floor panel sections S1 and S2 are formed aligned in the car body lengthwise direction and car crosswise direction in order for the 2×2 mode or 2×1 mode vibration to be generated in the frequency band near 250 Hz. Each of the rigidity adjusting parts 62 has roughly the same shape, being formed by causing the floor panel section S1 to be depressed downward in a roughly circular indentation.

Note that the floor panel sections S1 and S2 have a relatively large surface area, and in the case that no rigidity adjusting parts 62 are provided, the 2×2 mode resonance frequency is in a frequency band considerably lower than 250 Hz, so the rigidity adjusting parts 62 cause the rigidity to be greatly increased, thus making an adjustment so that the frequency generated in 2×2 mode becomes 250 Hz.

In this manner, with the floor panel sections S1 and S2, their vibration regions are squares of a size roughly 2×2 and rectangles of a size roughly 2×1, so a vibration surface area, vibration distribution and vibration amplitude of each of four antinodes of the 2×2 mode or each of two antinodes of the 2×1 mode become nearly equal, and as a result, the vibration volumes of the respective antinodes of vibration become nearly equal. In addition, because of the rigidity adjusting parts 62, 2×2 mode and 2×1 mode vibration are caused to occur at nearly 250 Hz, so acoustic emissions from the floor panel sections S1 and S2 can be decreased.

While the present invention has been illustrated by means of the preferred embodiment, one of ordinary skill in the art will recognize that modifications and improvements can be made while remaining within the sprit and scope of the invention. The scope of the invention is determined solely by the appended claims.

What is claimed is:

1. A floor panel structure of a car body where an automobile floor comprises a floor panel that is connected to frame members of the car body and that has a vibration mode adjusting structure which generates 2×1 mode vibration in a predetermined frequency band to suppress the generation of acoustic emission, wherein:

said floor panel has a non-rectangular vibration region, the vibration mode adjusting structure of said floor panel has a vibration adjusting part that defines the vibration distribution and vibration amplitude of the antinodes of 2×1 mode vibration, the vibration adjusting part being disposed within said non-rectangular vibration region so as to make the vibration volumes of two antinodes of vibration in 2×1 mode nearly the same.

2. The floor panel structure of a car body according to claim 1 wherein said vibration adjusting part comprises a circular protrusion formed by causing said floor panel to protrude upward or downward.

3. The floor panel structure of a car body according to claim 1 wherein said vibration adjusting part comprises a circular vibration damping material applied to said floor panel.

4. The floor panel structure of a car body according to any of claims 1 through 3 wherein the non-rectangular shape of the vibration region of said floor panel includes two opposing short sides of different lengths and said vibration adjusting part is provided on the side nearest the longer of the two short sides.

5. The floor panel structure of a car body according to any of claims 1 through 3 wherein the non-rectangular shape of the vibration region of said floor panel includes two opposing long sides and two of said vibration adjusting parts are provided aligned in a direction substantially parallel to the two long sides.

6. The floor panel structure of a car body according to claim 5 wherein said vibration adjusting parts are provided upon a line passing nearly intermediate between said two long sides.

7. The floor panel structure of a car body according to claim 5 wherein the non-rectangular shape of the vibration region of said floor panel includes two opposing short sides of different lengths, and said two provided vibration adjusting parts are such that the one on the side of the longer of the two short sides has a greater dimension than the one on the other side.

8. The floor panel structure of a car body according to claim 1 wherein said predetermined frequency band is a frequency band that nearly matches the tire cavity resonance frequency.

9. The floor panel structure of a car body according to claim 1 wherein said predetermined frequency band is a frequency band at roughly 250 Hz.

* * * * *